United States Patent Office 3,151,836
Patented Oct. 6, 1964

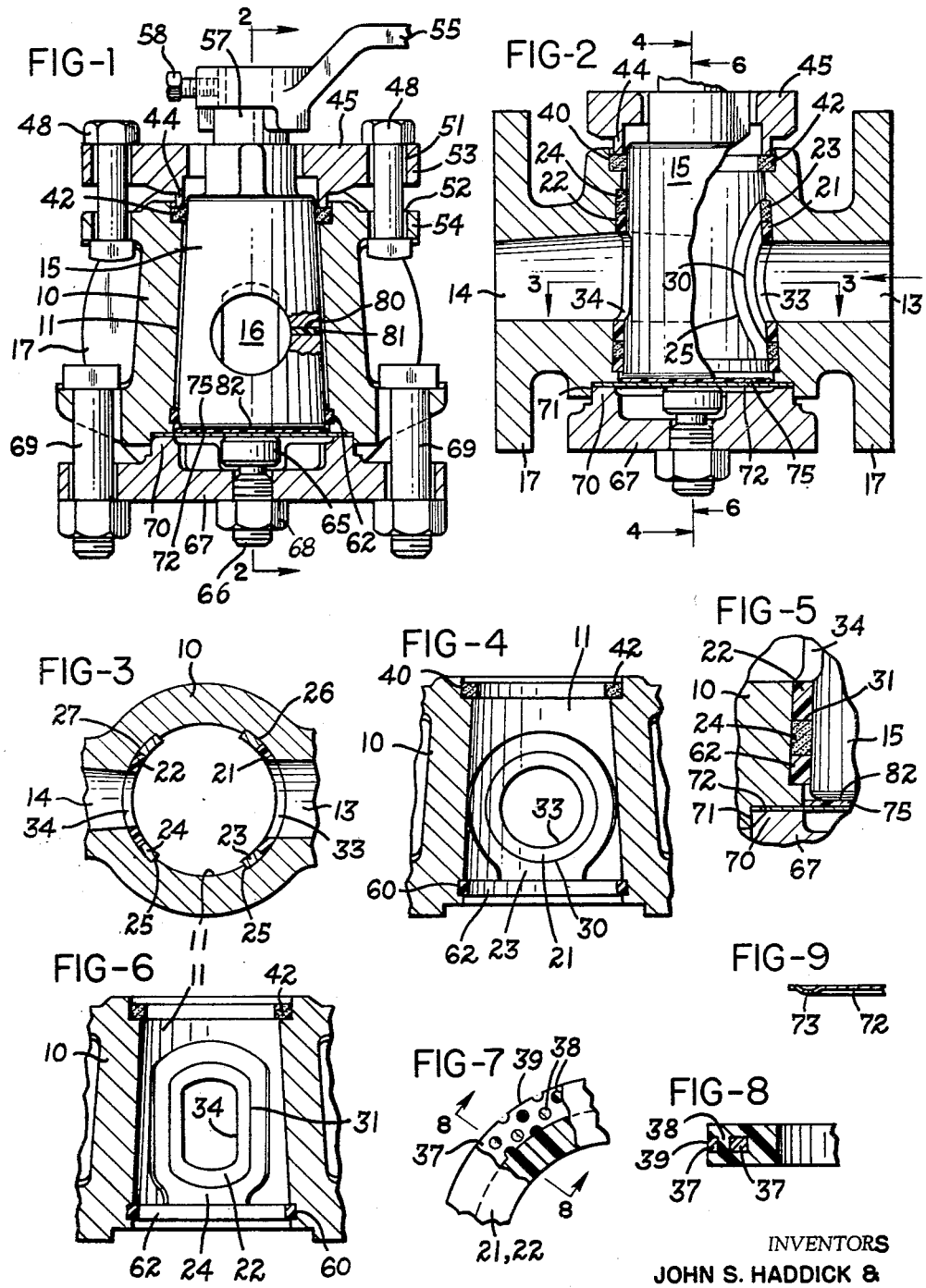

1

3,151,836
VALVE ASSEMBLY
John S. Haddick and Donn W. Duffey, Dayton, Ohio, assignors to The Duriron Company, Inc., Dayton, Ohio, a corporation of New York
Filed Aug. 20, 1962, Ser. No. 217,861
8 Claims. (Cl. 251—175)

This invention relates to valves and the like, and particularly to plug valves capable of withstanding high temperatures without failure.

It is a common practice to provide plug valves with a removable sleeve or liner element which surrounds the valve plug for the purpose of sealing against fluid leakage between the plug and the valve body. These liners have openings aligned with the inlet and outlet ports of the valve body, as well as with the port through the valve plug, and are preferably formed from a material which is resistant to corrosion and provides self-lubricating properties. A superior material for the purpose is a polyethylene resin material, namely, polytetrafluoroethylene and its interpolymers and copolymers, commercially available under the name "Teflon." This material provides the advantages of complete inertness in the presence of corrosive fluids including solvents, self-lubricating properties, low frictional drag when in contact with the corrosion resistant metals, toughness and resistance to physical wear and abrasion, use over a wide temperature range, and the ability to be cold worked under pressure.

Valves of the above type have proved very successful for many applications, but they are limited in the temperature ranges which they can handle because of the tendency of the Teflon resin to cold flow at elevated temperature and to suffer substantial weight losses above 700° F. If, therefore, a valve having a liner constructed of this material is subjected to such high temperatures, failure will occur since the valve is no longer capable of completely blocking the flow of fluid through the valve or of prohibiting leakage around the plug to the atmosphere. It is particularly important in the chemical industry, where acids and highly flammable fluids are handled, to utilize valves which are not susceptible to failure when subjected to high temperatures which occur when a fire breaks out. On the other hand, these valves must be resistant to corrosive fluids, as well as self-lubricating and resistant to wear.

Accordingly, one object of this invention is to provide a sleeve-lined valve which is self-lubricating and resistant to corrosion and wear over extended periods of use, and which will withstand high temperature without failure.

Another object of the invention is to provide a valve capable of resisting failure when subjected to elevated temperatures while having the advantages derived from the use of a polytetrafluoroethylene sealing member between the valve plug and the valve body.

A further object of the invention is to provide a plug valve having a seal positioned between the valve body and the plug which includes a polytetrafluoroethylene seal around the inlet and outlet ports for normally preventing the fluid handled by the valve from leaking between the body and the plug, and also having a fire resistant backup seal which will prohibit such fluid flow if the polytetrafluoroethylene seal should fail as a result of being subjected to high temperatures or for any other reason.

A further object of this invention is to provide a firesafe valve assembly including a tapered plug for controlling flow therethrough and apparatus for automatically increasing the pressure between the seals and the plug when the valve assembly is subjected to high temperature, and specifically to provide such a valve assembly which is simple in construction and offers a maximum of dependability over extended periods of use although being comparatively inexpensive to manufacture.

Other objects and advantages of the invention will be apparent from the following description, the accompanying drawings and the appended claims.

In the drawings—

FIG. 1 is a sectional view through a plug valve assembly embodying the invention and showing the plug in an open position;

FIG. 2 is a sectional view essentially along the line 2—2 of FIG. 1 and showing the valve plug partially broken away;

FIG. 3 is a fragmentary sectional view taken along the line 3—3 of FIG. 2 illustrating the seals and with the valve plug removed;

FIG. 4 is a fragmentary sectional view taken essentially along the line 4—4 of FIG. 2 also with the plug removed to illustrate the seal arrangement around the inlet port;

FIG. 5 is a fragmentary sectional view illustrating the seal arrangement at one end of the bore which extends through the valve body;

FIG. 6 is a view similar to FIG. 4 taken along the line 6—6 of FIG. 2 to illustrate the seal around the outlet port;

FIG. 7 is a fragmentary view, partially broken away, illustrating a portion of the face of one of the primary seals which surround the inlet and outlet ports in the valve of FIG. 1;

FIG. 8 is an enlarged sectional view taken along the line 8—8 of FIG. 7; and

FIG. 9 is a fragmentary sectional view through one edge of the support diaphragm before it is placed into the valve assembly.

Referring to the drawings, which illustrate a preferred embodiment of the invention, the valve assembly shown in FIGS. 1 and 2 includes the valve body 10 having a conical bore 11 extending therethrough, and transverse inlet and outlet ports 13 and 14 intersect the bore 11 on opposite sides thereof. A tapered plug 15 is rotatable in the bore 11 and has a through port 16 for connecting the body ports 13 and 14, and suitable flanges 17 are provided on the valve body 10 around the outer ends of the ports for connection to pipes or other fluid conduits in the usual manner.

The inlet and outlet ports 13 and 14 in the body 10 are differently contoured in order to assure throttling of the flow at the downstream end of the complementarily contoured plug port 16 as described in United States Patent No. 2,987,295 for Plug Valves, issued June 6, 1961, to the assignee of this application. More specifically, the inlet port 13 is shown as substantially circular, whereas the outlet port 14 is elongated in the direction of the plug axis but is narrower in the circumferential direction as compared with inlet port 13. The inlet and outlet ends of the plug port 16 are similarly contoured so that as the plug turns from open to closed position the outlet port 14 will close completely while the inlet port 13 is still in open communication with the interior of the plug port 16. It will be apparent, however, that the conventional arrangement of identical inlet and outlet ports may be used without sacrificing the advantages of the invention.

The sealing arrangement between the plug 15 and body 10 in accordance with the invention includes annular primary seals 21 and 22 held in position around each of the ports 13 and 14, respectively, by secondary or backup annular seals 23 and 24 which are in turn held in position by the peripheries 25 of recesses 26 and 27 formed in the surface of the bore 11. As shown in FIG. 3, both the primary and backup seals have a thickness greater than the depth of the associated recesses 26 and 27 so that when the plug 15 is positioned in the bore 11, there is sealing contact between the seals 21–24 and the plug 20.

The primary seals 21 and 22, the backup seals 23 and 24, and the recesses 26 and 27 have outer configurations which conform generally to the shape of the associated ports 13 and 14, although the outer shapes of these elements can be varied so long as the primary seals entirely surround the ports 13 and 14, and the backup seals 23 and 24 entirely surround the primary seals 21 and 22, respectively. The central openings 30 and 31 in the backup seals 23 and 24, respectively, have appropriate internal dimensions so the primary seals 21 and 22 can be inserted and held tightly therein. The central ports 33 and 34 provided in the seals 21 and 22, respectively, are aligned with the associated inlet or outlet ports 13 and 14 when the primary seals are properly mounted.

The backup seals 23 and 24 are preferably constructed of a material containing asbestos with a suitable binder so that these seals will remain effective when subjected to temperatures above those which may cause the primary seals 21 and 22 to fail. For example, one suitable asbestos material is sold under the name "Durabla" and comprises compressed asbestos fibers bonded together with a rubber base binder. Another suitable material is sold under the trade name Bi-Metal-ic and comprises long strands of asbestos which are cross-laminated and thus have a high tensile strength. It is possible to coat this material with molybdenum bisulphide which adds lubricating characteristics thereto and consequently reduces the friction between backup seals 23 and 24 and the plug 15.

The primary seals 21 and 22 are preferably constructed of polytetrafluoroethylene which provides the aforementioned advantages of self-lubrication, corrosion and wear resistance. To emphasize these advantages, the seals 21 and 22 may be provided with a thickness slightly greater than that of the backup seals 23 and 24 so that a greater degree of sealing pressure is exerted between the plug 15 and the valve body 10 in the area of the primary seals 21 and 22. However, this difference in thickness must permit enough sealing pressure in the area of the backup seals 23 and 24 so that an effective seal is provided between the valve body 10 and the plug 15 should either of the primary seals 21 or 22 fail.

As shown in FIGS. 7 and 8, a ring 37 of perforated metal is embedded in the outer peripheral portion of each primary seal 21 and 22 during the construction thereof so that the polytetrafluoroethylene extends through the perforations 38 in the ring 37 to form a substantially integral part of the primary seals. The outer periphery 39 of the metal ring 37 is substantially flush with the outer peripheral edge of the seals 21 and 22 for the purpose of adding rigidity to and thus maintaining the configuration of the primary seals 21 and 22. This ring 37 also serves the important purpose of maintaining the shape of the openings 30 and 31 in the backup seals 23 and 24, respectively, if the primary seals 21 and 22 should lose their mechanical characteristics or suffer weight losses due to high temperatures, thus reducing the possibility of deformation of the backup seals even if the polytetrafluoroethylene material should completely decompose. The primary seals 21 and 22 are readily constructed as described in accordance with the teaching of United States Patent No. 2,976,093, entitled "Fabrication of Plastic Material," issued March 21, 1961, to the assignee of this application.

The upper or smaller end of the bore 11 is provided with a counterbore 40 which supports a heat resistant packing 42 clamped in position by the annular flange 44 on the upper cap 45 so that a fluid tight seal is formed between the valve body 10 and the plug 15. The cap 45 is secured to the valve body 10 by the conventional fasteners 48 which project through openings 51 and 52 in ears 53 and 54 formed on the cap 45 and the body 11, respectively. A manually operated handle 55, releasably secured to the upper extension 57 of the plug 15 by a screw 58, is provided for the purpose of rotating the plug 15.

A circumferential groove 60 is formed in the lower end of bore 11 for receiving a seal ring 62 which has a thickness greater than the depth of the groove 60 so that it contacts the plug 15 and provides additional sealing against fluid leakage in a downward direction between the valve body and plug. This seal ring is preferably formed of polytetrafluoroethylene and has an internal diameter which is substantially equal to the internal diameter of the adjacent portion of the backup seals 23 and 24 so that the sealing pressure between the primary seals 21 and 22 and the plug is not materially reduced by the seal ring 62.

The plug 15 is maintained in adjustable pressure sealing relation with the seals 21 and 22 by means of a thrust member 65 and pressure screw 66 threaded through the cap 67 and provided with a lock nut 68. The cap 67 closes the larger end of the bore 11 and is secured in position on the body 10 by a plurality of bolts 69 in the usual way, and it includes a boss portion 70 which is received in a counterbore 71 surrounding the larger end of the bore 11. A diaphragm 72, preferably of metal, is also received in the counterbore 71 for clamping in sealing relation between the boss portion 70 and the valve body. The diaphragm 72 may be provided with a peripheral bead 73 as shown in FIG. 9 for increased sealing effectiveness, and a disk 75 of Teflon resin or other suitable material is positioned between the diaphragm 72 and the plug 15 to reduce the turning friction of the plug.

To enhance the fire-safe features of the valve assembly, a small bore 80 is drilled through the plug 15 into the plug port 16 so that when the plug 15 is moved to the closed position, the bore 80 interconnects the inlet port 13 and the plug port. The bore 80 is filled or plugged with polytetrafluoroethylene 81 so that the valve assembly normally operates as if this bore was not present, but if the polytetrafluoroethylene primary seals 21 and 22 and the seal ring 60 should break down, the material 81 in bore 80 will likewise break down causing pressurized fluid to flow from the inlet port 13, through the bore 80, into the plug port 16, and around the outside surfaces of plug 15 to exert an upward force on the bottom surface 82 thereof, thus maintaining close sealing contact between the plug and the secondary seals 23 and 24. This pressurized fluid cannot escape from the top and bottom of the bore 11 due to the packing 42 and diaphragm 72, respectively, nor can it escape through the outlet port 14 since the backup seal 24 surrounds this port between the valve body 10 and the plug 15.

It should now be apparent that the ports 13 and 14 can take any of the conventional shapes without departing from the scope of the invention. The inventive sealing arrangement can also be utilized in conjunction with a single port in a valve assembly, and similarly it could be utilized with each of the ports in a multiport valve assembly.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A fail-safe plug valve comprising a valve body having a tapered bore therethrough, means defining a port in said body intersecting said bore, a tapered plug rotatably mounted in said bore and including a passageway therein for controlling the flow of fluid through said port, a primary seal member interposed between said bore and said plug in surrounding relation with said port for blocking flow from said port into said bore, a secondary seal member in surrounding relation with said primary seal member for providing a backup seal against leakage from said port into said bore if said primary seal member should fail, said primary and secondary seal members both being disposed with correspondingly curved sealing faces and with the inner periphery of one of said seal members contacting the other of said seal members along the outer periphery thereof, and means for holding said seal members in position.

2. A fail safe plug valve comprising a valve body having a tapered bore therethrough, means defining inlet and outlet ports in said body intersecting said bore, a tapered plug rotatably mounted in said bore and including a passageway therethrough for controlling the flow of fluid between said ports, primary seal members interposed between said bore and said plug in surrounding relation with each of said ports for sealing against flow from said ports into said bore, a secondary seal member surrounding each of said primary seal members for holding the same in position and providing a backup seal against leakage from said ports into said bore if either of said primary seal members should fail, said primary seal members and said secondary seal members both being disposed with correspondingly curved sealing faces and with the inner periphery of the secondary seal member contacting the outer periphery of the corresponding primary seal member, and means for securely holding said secondary seal members in said body.

3. A fail-safe plug valve comprising a valve body having a tapered bore therethrough, means defining inlet and outlet ports in said body intersecting said bore, a tapered plug rotatably mounted in said bore and having a port therethrough for cooperation with said body ports, primary seal members interposed between said body and said plug in surrounding rotation with each of said body ports for sealing against flow between said ports and said bore, secondary seal members surrounding each said primary seal member for holding the same in position and providing a backup seal against leakage between said ports and said bore if either of said primary seal members should fail, means for holding said secondary seal members in said body, means forming a seal between the smaller end of said plug and said body, means forming a closed chamber in said body overlying the larger end of said plug, and means for connecting said inlet port with said chamber if said primary seals should fail to cause fluid from said inlet port to urge said plug into said bore thus increasing the sealing pressure between said plug and said secondary seal members.

4. A fire-safe plug valve comprising a valve body having a bore therethrough, means defining inlet and outlet ports in said body intersecting said bore, a plug rotatably mounted in said bore and having a port therethrough for cooperation with said body ports, primary seal members of polytetrafluoroethylene material interposed between said body and said plug in surrounding relation with each of said body ports for sealing against flow between said ports and said bore, heat resistant secondary seal members in surrounding relation with each of said primary seal members for holding the same in position and providing a backup seal against leakage between said ports and said bore, each of said primary seal members and the corresponding secondary seal member both being disposed with correspondingly curved sealing faces to define a pair of cooperating seal members with the inner periphery of one of the said seal members contacting the outer periphery of the other of the said seal members, and means for holding said secondary seal members in said body.

5. A fire-safe plug valve comprising a valve body having a tapered bore therethrough, means defining inlet and outlet ports in said body intersecting said bore, a tapered plug rotatably mounted in said bore and having a port therethrough for cooperation with said body ports, primary seal members of polytetrafluoroethylene material interposed between said body and said plug in surrounding relation with each of said body ports for sealing against flow between said ports and said bore, heat resistant secondary seal members surrounding each said primary seal member for holding the same in position and providing a backup seal against leakage between said ports and said bore if either of said primary seal members should fail, and a metal ring embedded in the outer periphery of each said primary seal member in substantially coextensive relation with the outer peripheral edge thereof for maintaining the configuration of said secondary seal member.

6. A fire-safe plug valve comprising a valve body having a tapered bore therethrough, means defining inlet and outlet ports in said body intersecting said bore, a tapered plug rotatably mounted in said bore and having a port therethrough for cooperation with said body ports, primary seal members of polytetrafluoroethylene material interposed between said body and said plug in surrounding relation with each of said body ports for sealing against flow between said ports and said bore, heat resistant secondary seal members surrounding each primary seal member for holding the same in position and providing a backup seal against leakage between said passages and said bore if either of said primary seal members should fail, and said primary seal members having a thickness slightly greater than said secondary seal members for increasing the sealing pressure between said plug and said body in the area of said primary seal members.

7. A fire-safe plug valve assembly comprising a valve body having a bore therethrough, means defining a port in said body intersecting said bore, a plug rotatably mounted in said bore and having a port therethrough for cooperation with said body port, means defining a recess in the surface of said bore surrounding said body port, a secondary seal member of a high temperature resistant material having substantially the same outer configuration as said recess for mounting therein, said secondary seal having a central opening aligned with and substantially larger than said body port, a primary seal member of a corrosion resistant self-lubricating material having substantially the same outer configuration as said opening for mounting therein against the surface of said recess, said primary seal member having a port therethrough aligned with said body port, and said seal members each having a thickness greater than the depth of said recess so that said plug engages said seal members for preventing leakage between said port and said bore.

8. A fire-safe plug valve comprising a valve body having a tapered bore therethrough, means defining inlet and outlet ports in said body intersecting said bore, a tapered plug rotatably mounted in said bore and having a port therethrough for cooperation with said body ports, primary seal members of polytetrafluoroethylene material interposed between said body and said plug in surrounding relation with each of said body ports for sealing against flow between said ports and said bore, heat resistant secondary seal members surrounding each said primary seal member for holding the same in position and providing a backup seal against leakage between said ports and said bore if either of said primary seal members should fail, means sealing the ends of said bore from the atmosphere to define a space around the larger end of said plug, means forming a passage in said plug for interconnecting said inlet port and said valve port when said plug is in a closed position, and decomposable material normally blocking said passage and adapted to decompose under the same conditions as said primary seals to effect flow of fluid from said inlet port by way of said passage and plug port to said space when said plug is in said closed position for pressurizing said space and urging said large end of said plug into said bore thus decreasing the sealing pressure between said plug and said secondary seal members when said polytetrafluoroethylene material fails.

References Cited in the file of this patent

UNITED STATES PATENTS

| | | |
|---|---|---|
| 2,912,219 | Clade | Nov. 10, 1959 |
| 2,942,840 | Clade | June 28, 1960 |

FOREIGN PATENTS

| | | |
|---|---|---|
| 9,945 | Denmark | Aug. 26, 1907 |

UNITED STATES PATENT OFFICE
CERTIFICATE OF CORRECTION

Patent No. 3,151,836                                    October 6, 1964

John S. Haddick et al.

It is hereby certified that error appears in the above numbered patent requiring correction and that the said Letters Patent should read as corrected below.

Column 5, line 15, for "fail safe" read -- fail-safe --; column 6, line 29, strike out "the"; column 7, line 6, for "decreasing" read -- increasing --.

Signed and sealed this 9th day of March 1965.

(SEAL)
Attest:

ERNEST W. SWIDER
Attesting Officer

EDWARD J. BRENNER
Commissioner of Patents